US012665368B2

(12) United States Patent
Takai

(10) Patent No.: US 12,665,368 B2
(45) Date of Patent: Jun. 23, 2026

(54) PLUG CONNECTOR, HOUSING FOR PLUG CONNECTOR, AND MANUFACTURING METHOD OF HOUSING FOR PLUG CONNECTOR

(71) Applicant: YAMAICHI ELECTRONICS CO., LTD., Tokyo (JP)

(72) Inventor: Yosuke Takai, Tokyo (JP)

(73) Assignee: Yamaichi Eletronics Co., Ltd., Tokyo (JP)

( * ) Notice: Subject to any disclaimer, the term of this patent is extended or adjusted under 35 U.S.C. 154(b) by 400 days.

(21) Appl. No.: 18/339,555

(22) Filed: Jun. 22, 2023

(65) Prior Publication Data

US 2023/0420904 A1 Dec. 28, 2023

Related U.S. Application Data

(60) Provisional application No. 63/354,814, filed on Jun. 23, 2022.

(51) Int. Cl.
*H01R 43/24* (2006.01)
*H01R 13/08* (2006.01)

(52) U.S. Cl.
CPC ............ *H01R 43/24* (2013.01); *H01R 13/08* (2013.01)

(58) Field of Classification Search
CPC ........ H01R 43/24; H01R 13/08; H01R 13/41; H01R 43/18; H01R 24/60; H01R 13/6477; H01R 13/40; H01R 12/722; H01R 12/73; H01R 13/502; H01R 13/6473; B29L 2031/34; B29C 45/14385; B29C 45/14426; G02B 6/4274
See application file for complete search history.

(56) References Cited

U.S. PATENT DOCUMENTS 5,411,408 A * 5/1995 DiViesti ............... H01R 12/724 439/637
5,425,658 A * 6/1995 White .................... H01R 12/00 439/60
5,800,203 A * 9/1998 Pratt ...................... H01R 13/41 439/60
(Continued)

FOREIGN PATENT DOCUMENTS

CN 201536170 U 7/2010
CN 205828722 U 12/2016
(Continued)

OTHER PUBLICATIONS

Partial European Search Report for serial No. EP23180334; issued Apr. 3, 2024.

*Primary Examiner* — Truc T Nguyen
(74) *Attorney, Agent, or Firm* — Flener IP & Business Law

(57) ABSTRACT

A plug connector 200 configured to be inserted in a host connector 100 includes a plurality of contact pins aligned in a predetermined direction and a housing 210 configured to hold the plurality of contact pins. Each of the contact pins extends in an intersecting direction that is a direction intersecting the predetermined direction, and the housing 210 includes pin grooves **212*a* provided in the surface thereof, extending in the intersecting direction, and configured to accommodate the contact pins and includes holes 212*b* provided aligned with the pin grooves 212*a* in the intersecting direction and recessed deeper than the pin grooves 212*a*** from the surface.

5 Claims, 18 Drawing Sheets

(56) References Cited

U.S. PATENT DOCUMENTS

| | | | | |
|---|---|---|---|---|
| 9,748,684 | B2 * | 8/2017 | Singer | H01R 13/18 |
| 2007/0224850 | A1 * | 9/2007 | Lappoehn | H01R 31/06 439/76.1 |
| 2011/0136383 | A1 * | 6/2011 | Ohta | G01R 1/0416 439/620.04 |
| 2015/0093936 | A1 * | 4/2015 | Little | H01R 24/64 439/607.19 |
| 2016/0365653 | A1 | 12/2016 | Takai et al. | |
| 2021/0203104 | A1 | 7/2021 | Chen | |
| 2023/0131012 | A1 * | 4/2023 | Wu | H01R 24/60 439/676 |
| 2023/0144251 | A1 * | 5/2023 | Lee | H01R 13/514 439/607.05 |
| 2023/0327356 | A1 * | 10/2023 | Takahira | H01R 12/91 439/247 |
| 2023/0420904 | A1 | 12/2023 | Takai | |

FOREIGN PATENT DOCUMENTS

| | | | |
|---|---|---|---|
| CN | 110620315 | A | 12/2019 |
| CN | 220569928 | U | 3/2024 |
| EP | 3719938 | A1 | 10/2020 |
| EP | 4007076 | A1 | 6/2022 |
| JP | H10284197 | A | 10/1998 |
| JP | 2017004720 | A | 1/2017 |

* cited by examiner

PLUG CONNECTOR, HOUSING FOR PLUG CONNECTOR, AND MANUFACTURING METHOD OF HOUSING FOR PLUG CONNECTOR

BACKGROUND

1. Technical Field

The present invention relates to a plug connector, a housing for a plug connector, and a manufacturing method of a housing for a plug connector.

2. Description of Related Art

For example, Japanese Patent Application Laid-Open No. 2017-4720 discloses a plug connector configured to be inserted in a host connector. The plug connector disclosed in Japanese Patent Application Laid-Open No. 2017-4720 has a plurality of contact pins, which are contacted to contact pins provided to the host connector when inserted in the host connector, and a housing to which the plurality of contact pins are attached on the surface.

In some plug connectors having contact pins and a housing as with the plug connector disclosed in Japanese Patent Application Laid-Open No. 2017-4720, grooves are formed in the surface of the housing, the contact pins are placed on the bottom faces of the grooves, and thereby the contact pins are attached to the housing. If the contact pins are merely placed on the bottom faces of the grooves, however, this results in a large contact area between each contact pin and the housing, and the insertion loss may increase.

Accordingly, the present invention intends to provide a plug connector, a housing for a plug connector, and a manufacturing method of a housing for a plug connector that can reduce the insertion loss.

BRIEF SUMMARY

The plug connector according to the first aspect of the present invention is a plug connector configured to be inserted in a host connector, the plug connector includes: a plurality of contact pins aligned in a predetermined direction; and a housing configured to hold the plurality of contact pins, each of the contact pins extends in an intersecting direction that is a direction intersecting the predetermined direction, and the housing includes at least one groove provided in a surface of the housing, extending in the intersecting direction, and each configured to accommodate each of the contact pins and includes at least one hole provided aligned with the groove in the intersecting direction and recessed deeper than the groove from the surface.

In the configuration described above, the housing includes the hole. Accordingly, in a portion where the holes are formed, a space is defined between each contact pin and the housing. In other words, the contact pin and the housing are spaced apart from each other. Thus, compared to a case without the hole being formed, the contact area between each contact pin and the housing is reduced, and the insertion loss can thus be reduced.

Note that the hole may be a recess having a bottom or may be a through hole having no bottom.

In the plug connector according to the second aspect of the present invention, the housing includes a base part and a protruding part protruding in the intersecting direction from the base part and configured to be inserted in the host connector, the groove is provided in a surface of the protruding part, and the hole is provided at an end on the base part side of the protruding part, in the plug connector of the first aspect.

In the configuration described above, the hole is provided at the end on the base part side of the protruding part. Accordingly, the hole is formed at a position relatively distant from the host connector. Therefore, the insertion loss can be more suitably reduced.

In the plug connector according to the third aspect of the present invention, a plurality of holes each being the hole are provided, the plurality of holes are arranged aligned at a predetermined interval in the predetermined direction, and the predetermined interval is less than or equal to 0.5 mm, in the plug connector of the first aspect or the second aspect.

In the configuration described above, the plurality of holes are arranged aligned at an interval of 0.5 mm or less in a predetermined direction. Accordingly, even when a plurality of contact pins are arranged in tight alignment having an interval of 0.5 mm or less in the predetermined direction, the contact area between each contact pin and the housing can be reduced, and the insertion loss can thus be reduced.

The housing for a plug connector according to the first aspect of the present invention is a housing for a plug connector, the housing includes: a base part; and a protruding part protruding in one direction from the base part and configured to be inserted in a host connector, the base part includes insertion holes used for insertion of contact pins, the protruding part includes grooves used for accommodation of the contact pins, each of the grooves is provided in a surface of the protruding part, extends in the one direction, and corresponds to each of the insertion holes of the base part, and the protruding part includes, at an end of the base part side, holes provided aligned with the grooves in the one direction and recessed deeper than the grooves from the surface.

In the configuration described above, the housing includes holes. Accordingly, in a portion where the holes are formed, a space is defined between each contact pin and the housing. In other words, the contact pin and the housing are spaced apart from each other. Thus, compared to a case without the hole being formed, the contact area between each contact pin and the housing is reduced, and the insertion loss can thus be reduced.

Note that the hole may be a recess having a bottom or may be a through hole having no bottom.

A manufacturing method of the housing for a plug connector according to the first aspect of the present invention is a manufacturing method of a housing for a plug connector using a mold, a closed space is defined inside the mold when a stationary piece, slide pieces, and a movable piece are engaged with each other, the movable piece includes a plurality of core pins for forming insertion holes used for insertion of the contact pins in the housing, and the slide pieces have a plurality of groove formation parts for forming grooves used for accommodation of the contact pins in the housing, protrusions provided to the groove formation parts and protruding in a direction in the closed space beyond the groove formation parts, and fitting recesses formed in faces of the protrusions facing the movable piece. The manufacturing method includes: a fitting step of fitting tip portions of the core pins of the movable piece into the fitting recesses of the slide pieces when the slide pieces and the movable piece are engaged with each other; a resin injection step of injecting a liquid resin in the closed space defined by engagement of the stationary piece, the slide pieces, and the movable piece; and a resin solidification step of cooling and solidifying the resin injected to the closed space.

In the configuration described above, the slide piece includes the protrusion. Accordingly, a hole recessed from the surface is formed in the housing manufactured by using the mold. Accordingly, in the portion where the hole is formed, the contact area between each contact pin and the housing is reduced in a case where a space is defined between the contact pin and the housing compared to a case where no hole is formed, and the insertion loss can thus be reduced.

Further, in the configuration described above, the manufacturing method includes the fitting step of fitting the tip portions of the core pins of the movable piece into the fitting recesses of the slide pieces. Accordingly, in a state where the fitting recesses and the core pins are fitted to each other, the motion of the core pins is limited by the fitting recesses. This can suppress deformation of the core pin. Therefore, the molding accuracy of the housing can be improved.

DETAILED DESCRIPTION

A plug connector, a housing for a plug connector, and a manufacturing method of a housing for a plug connector according to one embodiment of the present disclosure will be described below with reference to FIG. 1 to FIG. 18.

The connector of the present embodiment is a device that electrically connects a module 320 and a mount substrate 310 (substrate) to each other.

Figure 1:
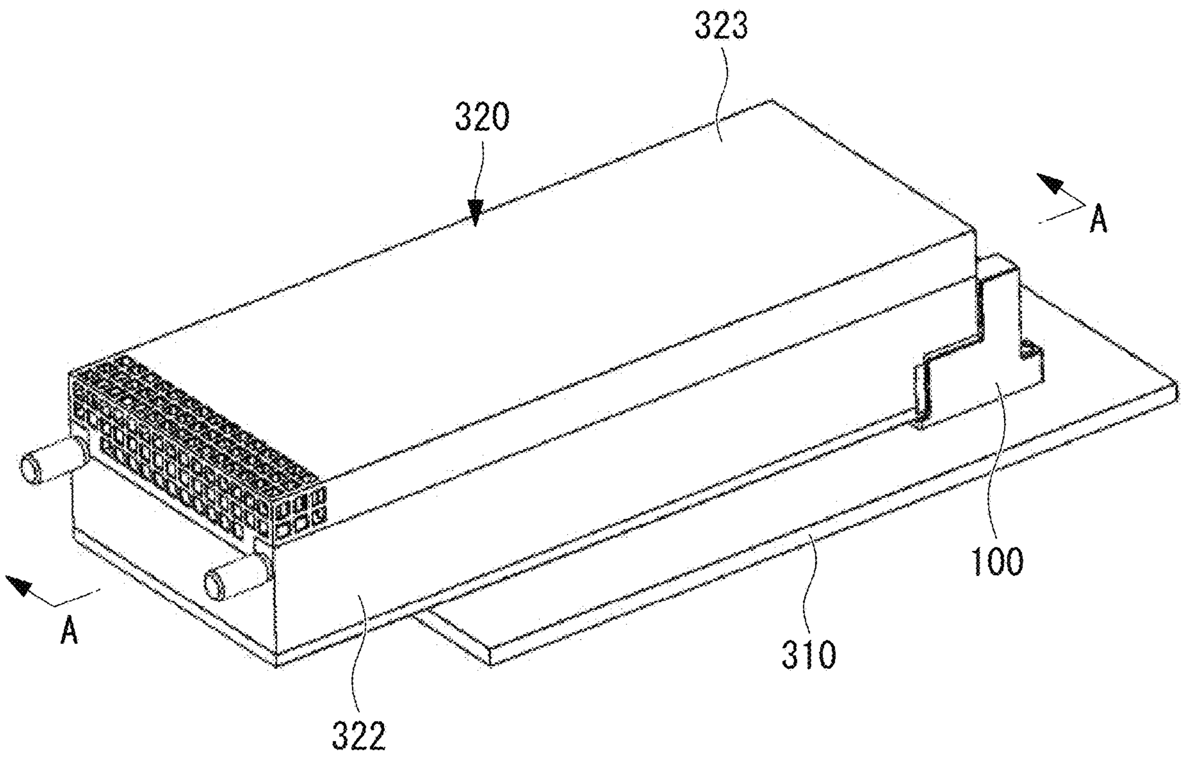
FIG. 1 is a perspective view of a module mounted on a mount substrate.
Figure 2:
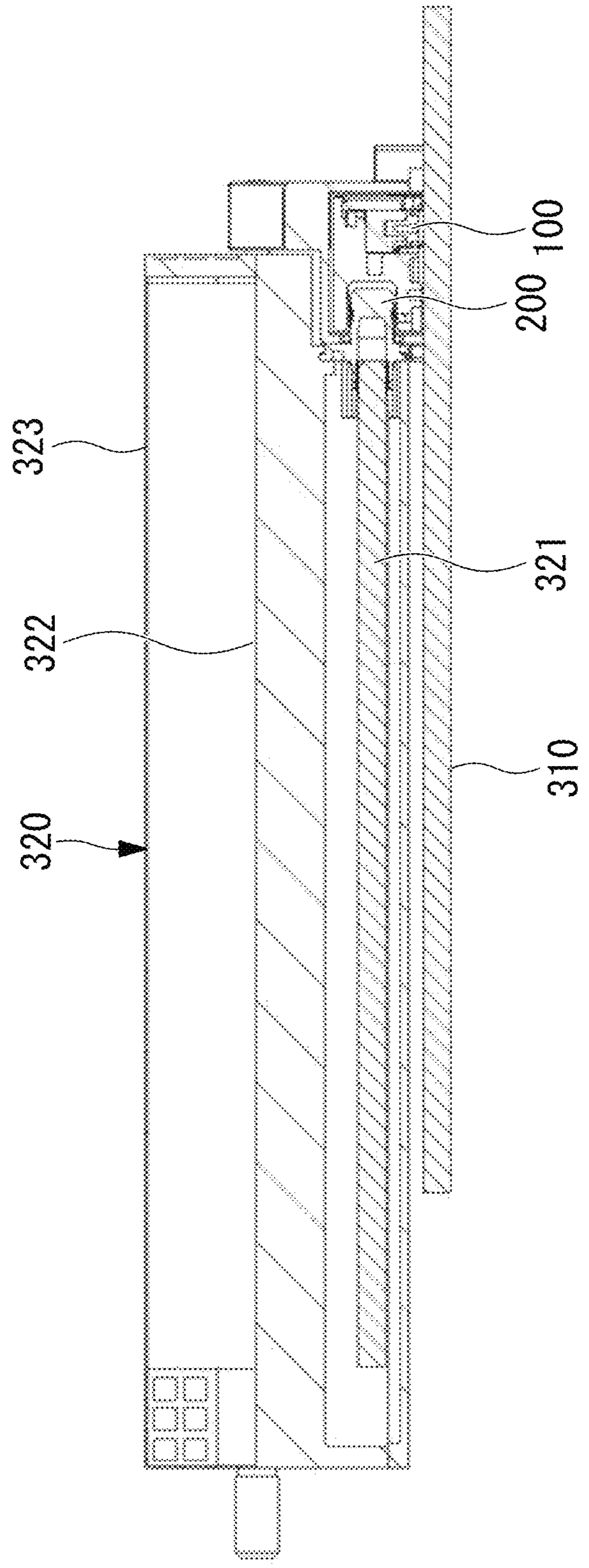
FIG. 2 is a sectional view taken along a cut line A-A illustrated in FIG. 1.

As illustrated in FIG. 1 and FIG. 2, the module 320 has a plug connector substrate 321 and a cage 322 that accommodates the plug connector substrate 321. Further, for efficient cooling, a heatsink 323 may be installed on the top face of the cage 322.

The plug connector substrate 321 is electrically connected to the mount substrate 310 via a host connector 100 mounted on the mount substrate 310 and via a plug connector 200 that connects the host connector 100 and the plug connector substrate 321 to each other.

The connector of the present embodiment corresponds to the host connector 100 and/or the plug connector 200 described above. These connectors are adapted for ultrahigh-speed transmission.

Note that the "ultrahigh-speed transmission" as used herein refers to high-speed transmission exceeding 100 Gbps using a PAM4 modulation scheme, for example.

[Host Connector]

The host connector 100 will be described below.

<Summary of Configuration of Host Connector>

The host connector 100 is a connector that is mounted on the mount substrate 310 and in which the plug connector 200 is inserted, that is, a connector for connecting the mount substrate 310 and the plug connector 200 to each other.

Figure 3:
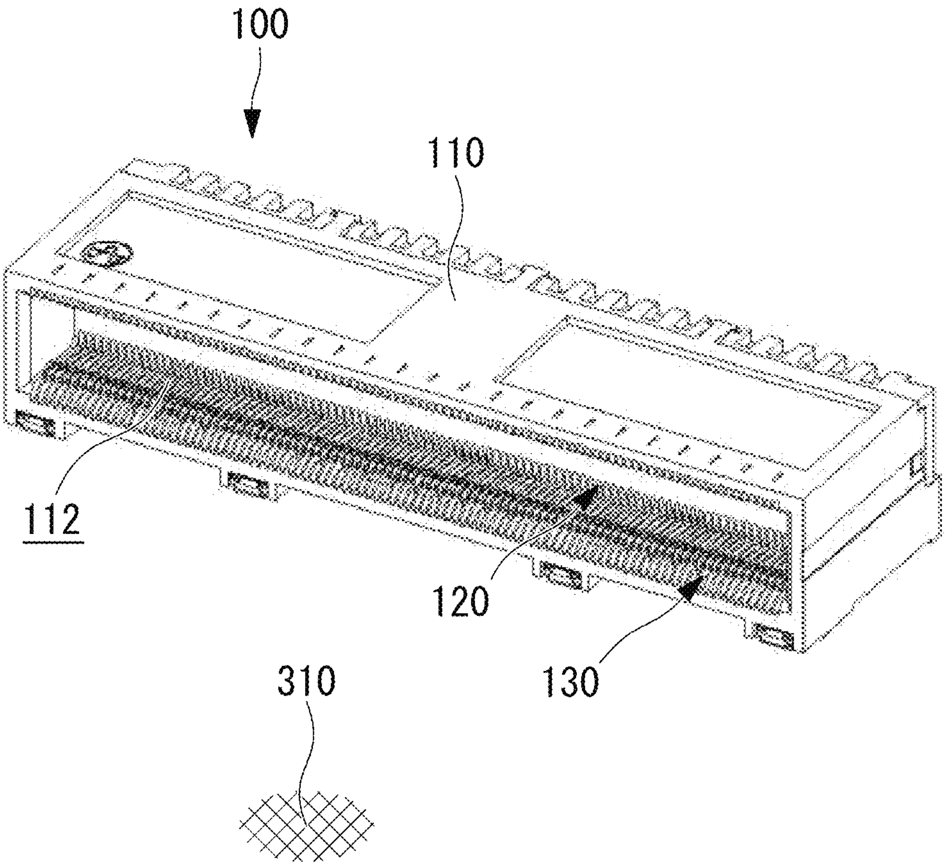
FIG. 3 is a perspective view of a host connector when viewed from above front.

As illustrated in FIG. 3, the host connector 100 has a housing 110, a top pin group 120, a bottom pin group 130, and the like.

The housing 110 is a component having substantially a rectangular parallelepiped external shape and accommodates and holds the top pin group 120, the bottom pin group 130, and the like.

The housing 110 is a nonconductive member and is molded from a resin or the like, for example.

The top pin group 120 has a plurality of contact pins arranged aligned at a predetermined interval in a predetermined direction. The contact pin is an elongated metal terminal for conduction. The contact pins included in the top pin group 120 are each contacted to corresponding contact pins included in the top pin group 220 provided to the plug connector 200 described later.

The bottom pin group 130 has a plurality of contact pins arranged aligned at a predetermined interval in a predetermined direction. The contact pin is an elongated metal terminal for conduction. The contact pins included in the bottom pin group 130 are each contacted to corresponding contact pins included in the bottom pin group 230 provided to the plug connector 200 described later.

[Plug Connector]

The plug connector 200 will be described below.

<Summary of Configuration of Plug Connector>

The plug connector 200 is a connector that is inserted in the host connector 100 and in which the plug connector substrate 321 is inserted, that is, a connector for connecting the host connector 100 and the plug connector substrate 321 to each other.

As illustrated in FIG. 4 to FIG. 7, the plug connector 200 includes a housing 210, the top pin group 220, and the bottom pin group 230.

In a state where the plug connector 200 has been inserted in the host connector 100, the top pin group 220 is in contact with the top pin group 120 of the host connector 100, and the bottom pin group 230 is in contact with the bottom pin group 130 of the host connector 100.

The housing 210 is a component having a plate-like part 211 and a protruding part 212 protruding from the back face of the plate-like part 211 and accommodates and holds the top pin group 120 and the bottom pin group 130.

The housing 210 is a nonconductive member and is molded from a resin or the like, for example.

Figure 7:
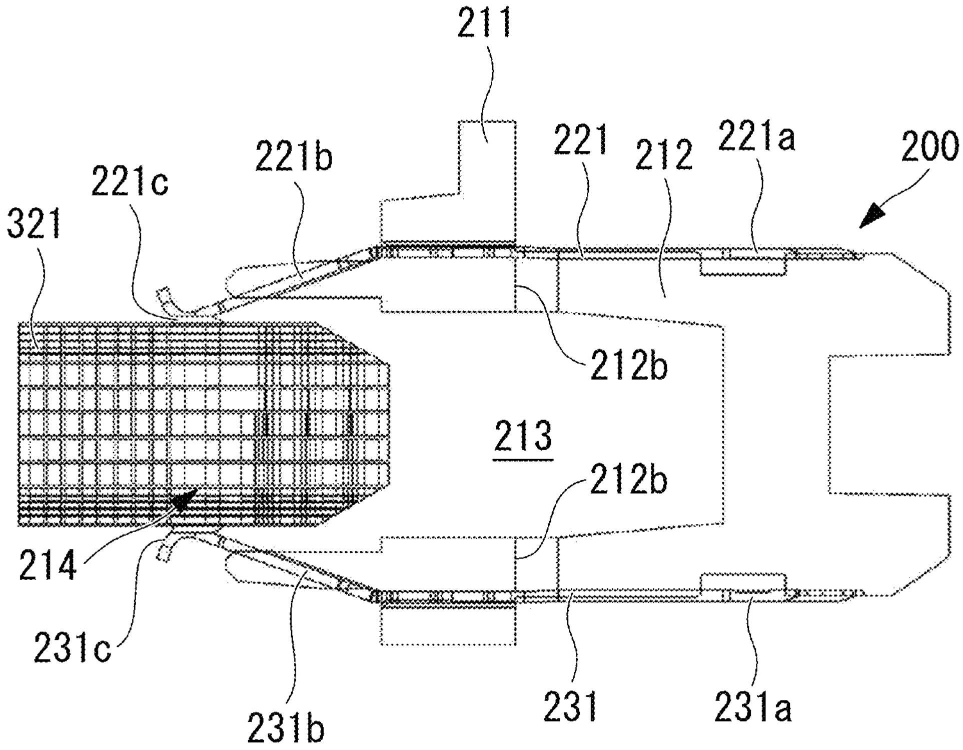
FIG. 7 is a transverse sectional view of the plug connector in which a plug connector substrate has been inserted.

As illustrated in FIG. 7, a substrate insertion space 213 is formed inside the housing 210.

The substrate insertion space 213 is a space in which the plug connector substrate 321 is inserted.

A front opening 214 communicating with the substrate insertion space 213 is opened in the front face of the housing 210.

Figure 8:
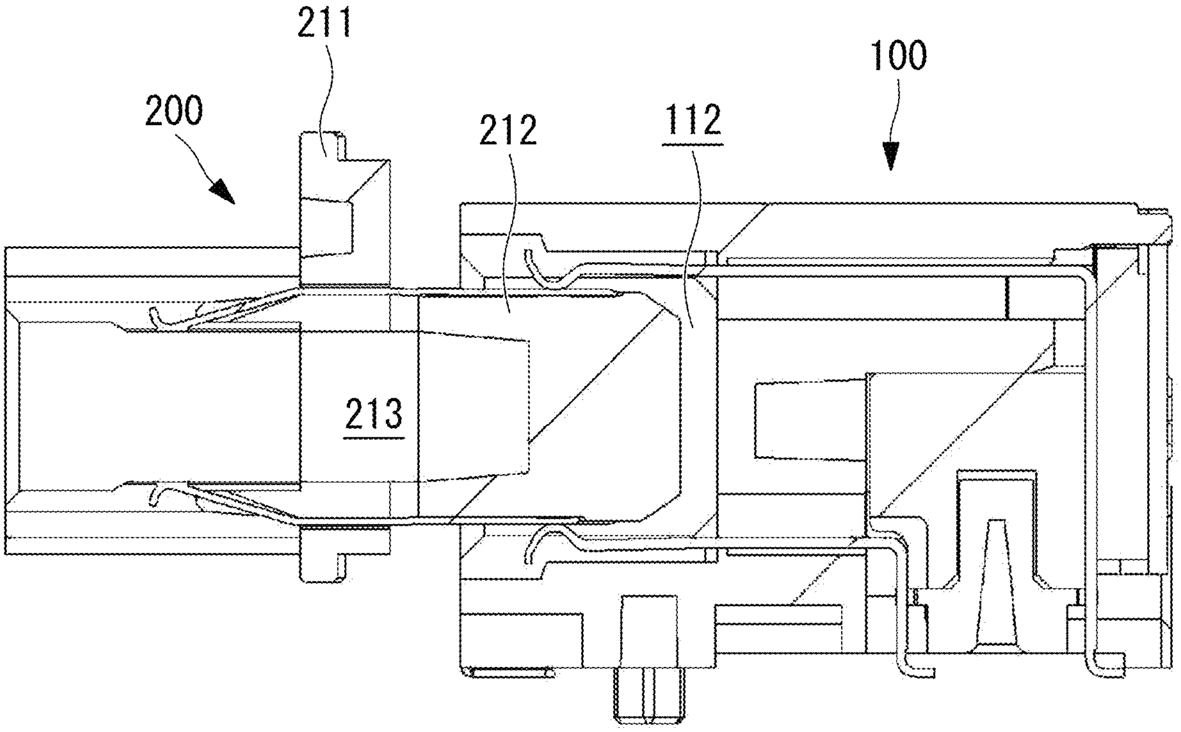
FIG. 8 is a transverse sectional view of the plug connector inserted in the host connector (the cross section through which a contact pin is passed).
Figure 9:
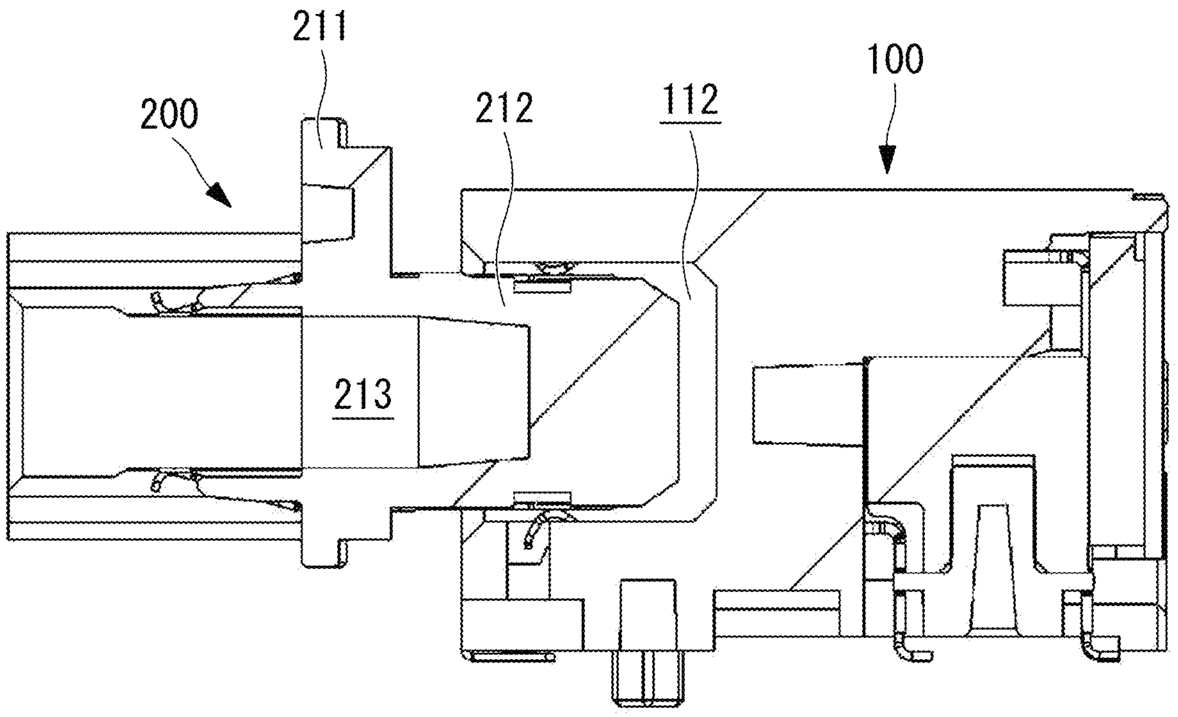
FIG. 9 is a transverse sectional view of the plug connector inserted in the host connector (the cross section through which no contact pin is passed).

As illustrated in FIG. 8 and FIG. 9, the protruding part 212 is a portion inserted in the plug insertion space 112 of the host connector 100.

The tip of the protruding part 212 is formed tapered. This enables easy insertion into the host connector 100.

Figure 10:
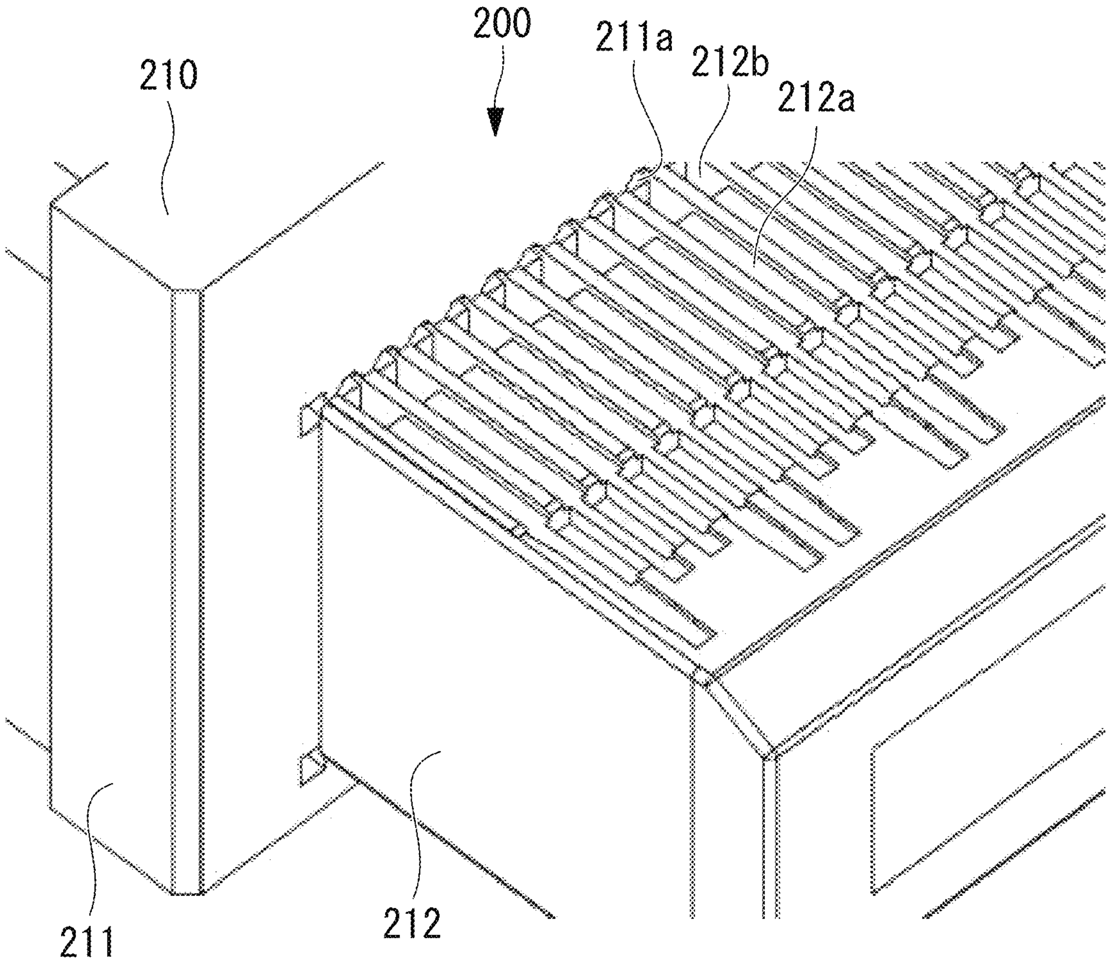
FIG. 10 is an enlarged perspective view of a part of a housing when viewed from above back.

As illustrated in FIG. 10, a plurality of pin grooves 212*a* are formed along the protruding direction of the protruding part 212 (intersecting direction)(that is, the direction of insertion into the host connector 100) in the top face of the protruding part 212.

The pin groove 212*a* is formed at equal pitches over the longitudinal direction(predetermined) of the housing 210.

Further, similar pin grooves 212*a* are formed in the bottom face of the protruding part 212.

Figure 11:
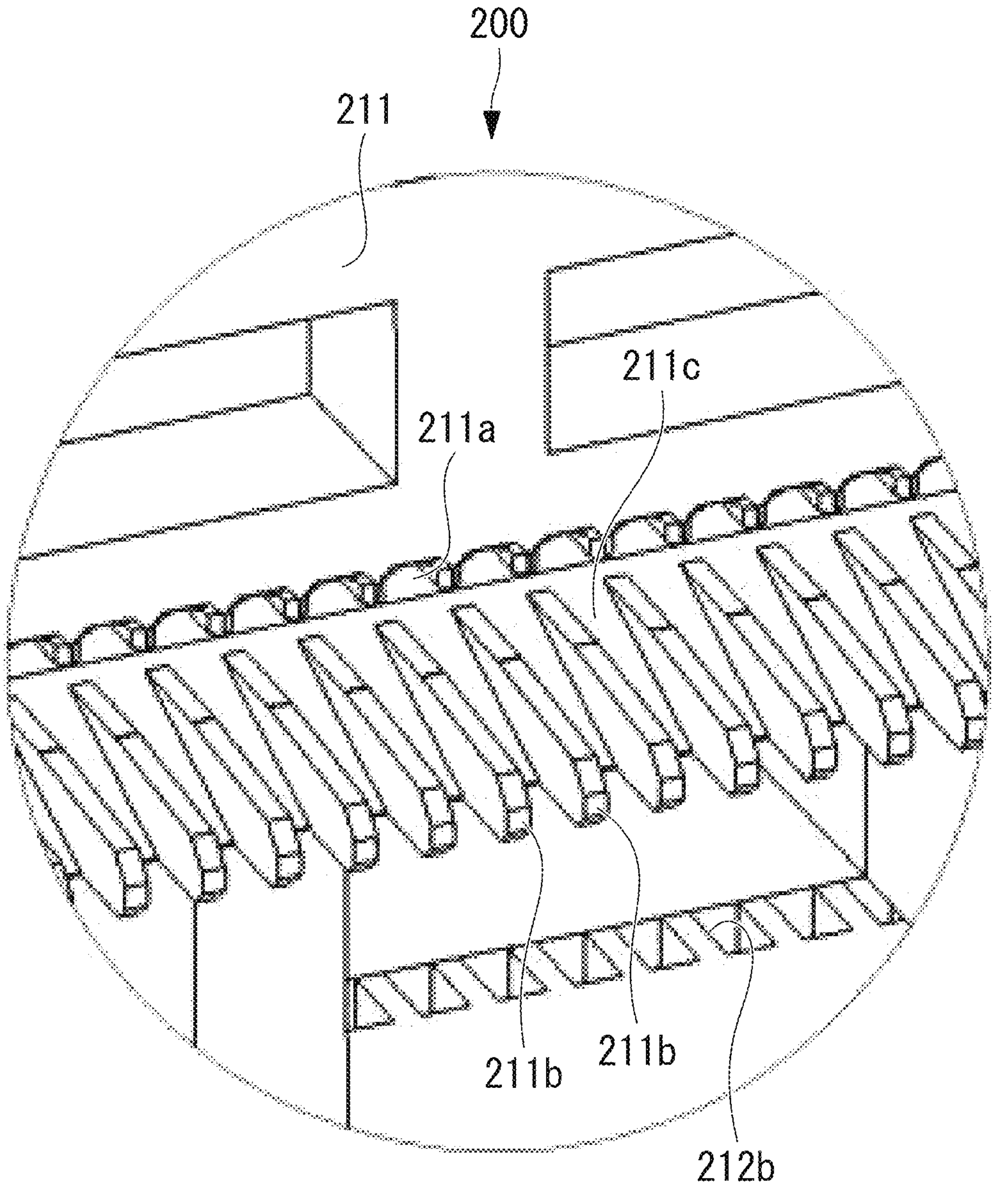
FIG. 11 is an enlarged perspective view of a part of the housing when viewed from above front.

As illustrated in FIG. 10 and FIG. 11, insertion holes 211*a* communicating between the front face and the back face are formed in the plate-like part 211. Each contact pin is inserted in the insertion hole 211*a* from the front face of the plate-like part 211.

The positions of respective insertion holes 211*a* in the longitudinal direction of the housing 210 correspond to the positions of respective pin grooves 212*a* formed in the protruding part 212. Thus, each contact pin inserted in the insertion hole 211*a* passes through each pin groove 212*a* for engagement.

As illustrated in FIG. 11, a plurality of partition parts 211*b* and a plurality of slope parts 211*c* are formed in the front face of the plate-like part 211.

Each partition part 211*b* is a plate-like wall/rib extending in the insertion direction of a contact pin (extending direction of a contact pin) and erecting in the height direction of the housing 210 and is formed at equal pitches over the longitudinal direction of the housing 210.

Figure 12:
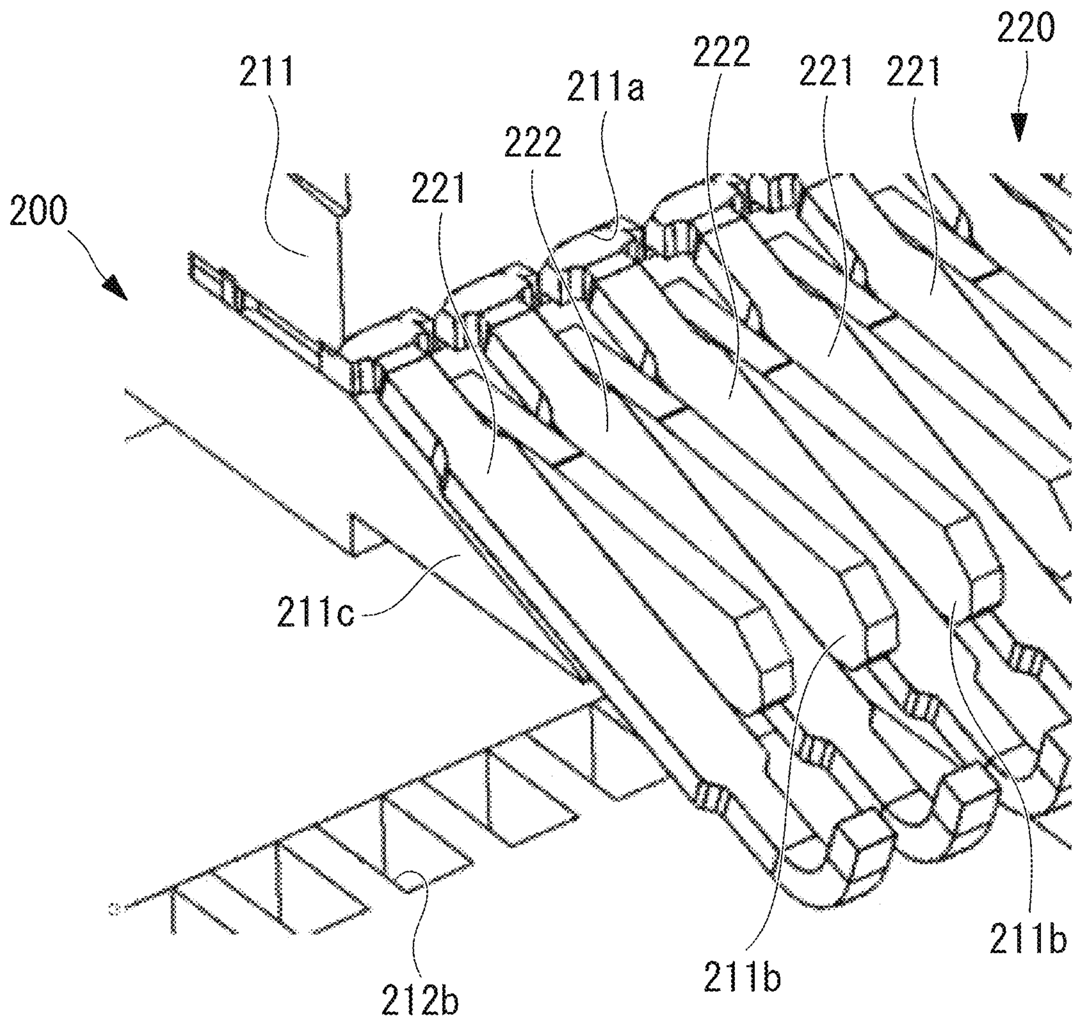
FIG. 12 is an enlarged perspective view of a part of the plug connector when viewed from above front.

The position of a clearance formed between adjacent partition parts 211*b* corresponds to the position of each insertion hole 211*a*. Thus, as illustrated in FIG. 12, each contact pin inserted in the insertion hole 211*a* passes through each clearance formed between the adjacent partition parts 211*b*. In other words, the partition part 211*b* separates adjacent contact pins from each other.

As illustrated in FIG. 11, each slope part 211*c* protrudes in the insertion direction of a contact pin from the front face of the plate-like part 211 and is formed continuously over the longitudinal direction of the housing 210.

In this state, the slope part 211*c* is located in a region of the root portion of the partition part 211*b*. In other words, each partition part 211*b* extends outward in the insertion direction of the contact pin from the slope part 211*c*.

The slope part 211*c* is tapered such that the outward faces on both sides are sloped relative to the horizontal direction.

The slope of the slope part 211*c* faces the inner face of the contact pin. Further, the inclination angle (inclination) of the slope approximately corresponds to the inclination angle of each inclined portion 221*b*, 222*b*, 231*b*, 232*b* (described later) in an unloaded state of each contact pin inserted in the insertion hole 211*a* (for example, a state where the plug connector substrate 321 is not inserted).

Thus, the slope part 211*c* can support the inclined portion 221*b*, 222*b*, 231*b*, 232*b* of each contact pin inserted in the housing 210 or prevent each contact pin from being bent inward due to an external load.

Note that other functions of the partition part 211*b* and the slope part 211*c* will be described later.

Figure 13:
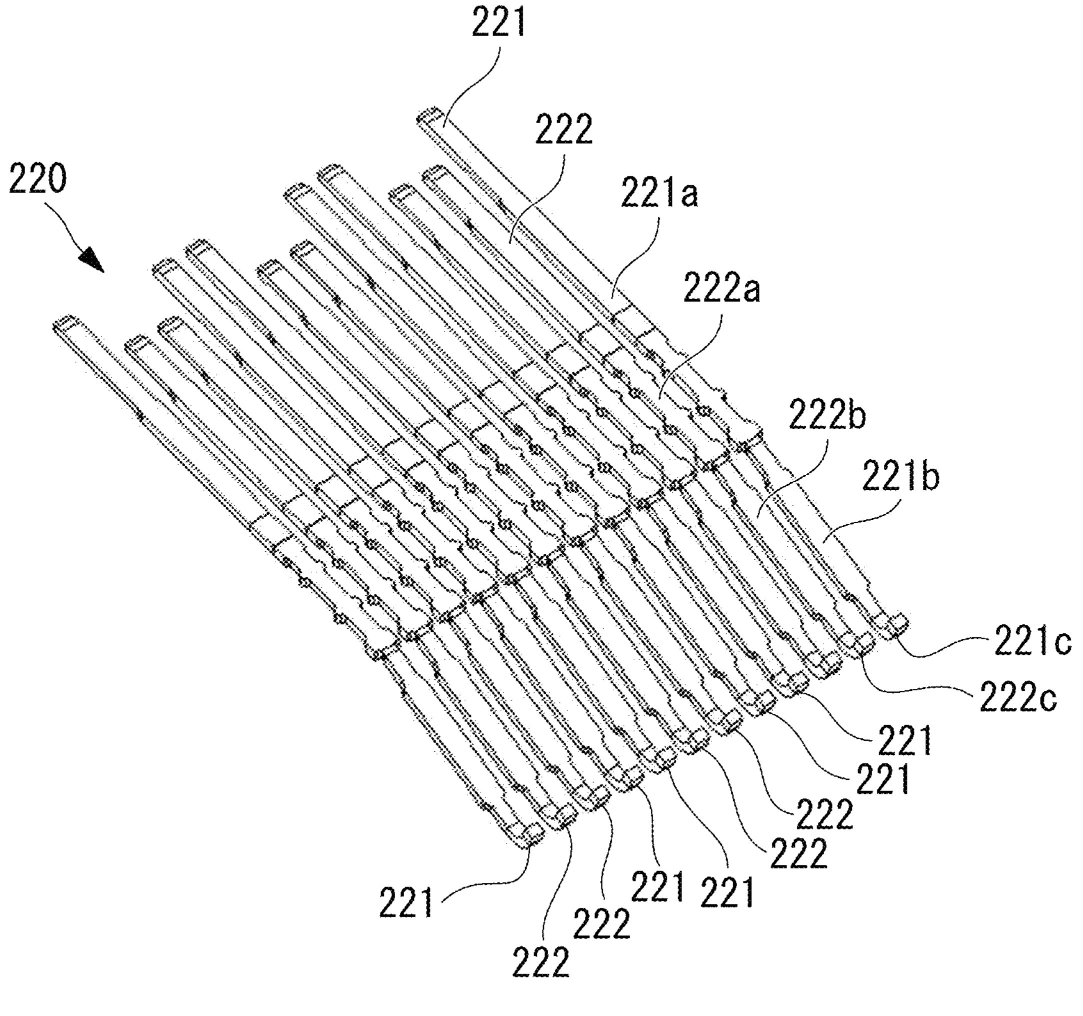
FIG. 13 is a perspective view of a part of the top pin group.

As illustrated in FIG. 13, the top pin group 220 is a group of contact pins configured such that a plurality of top ground pins 221 and a plurality of top signal pins 222 are aligned in the predetermined direction.

In the top pin group 220, the plurality of top ground pins 221 and the plurality of top signal pins 222 are aligned in accordance with the alignment of respective contact pins of the top pin group 120 of the host connector 100. That is, the top pin group 220 is of the double ground configuration corresponding to the top pin group 120 of the host connector 100.

Figure 6:
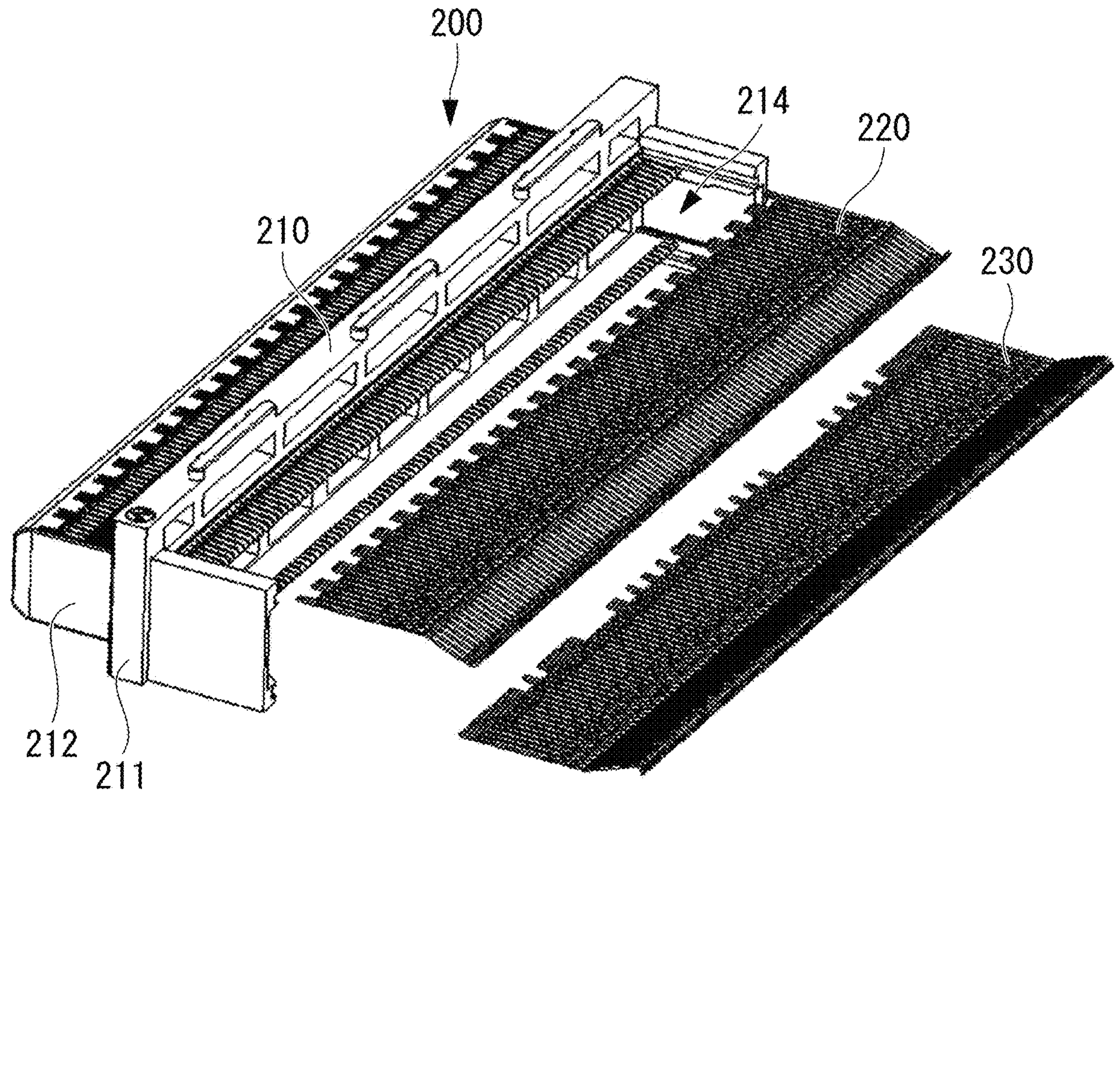
FIG. 6 is an exploded perspective view of the plug connector when viewed from above front.

As illustrated in FIG. 6, the alignment direction of these contact pins of the top pin group 220 matches the longitudinal direction of the housing 210.

As illustrated in FIG. 13, each top ground pin 221 is an elongated metal terminal for electrical conduction and has a base end portion 221*a* and an inclined portion 221*b*.

The base end portion 221*a* is a portion to which each top ground pin of the host connector 100 is contacted, and the base end portion 221*a* extends in substantially the horizontal direction.

The base end portion 221*a* passes through the insertion hole 211*a* and the pin groove 212*a* when the top ground pin 221 is held by the housing 210.

The inclined portion 221*b* is a portion inclined relative to the base end portion 221*a*.

A contact point part 221*c* bent convex toward the substrate insertion space 213 (see FIG. 7) is formed on the tip side of the inclined portion 221*b*. The contact point part 221*c* serves as a contact point with the plug connector substrate 321.

When the top ground pin 221 is inserted in and held by the housing 210, the inclined portion 221*b* passes through each clearance formed between adjacent partition parts 211*b* and extends outward from the back face of the plate-like part 211.

Each top signal pin 222 is an elongated metal terminal for electrical conduction and has a base end portion 222*a* and an inclined portion 222*b*.

The configuration of the base end portion 222*a*, the inclined portion 222*b*, and a contact point part 222*c* is the same as the configuration of the base end portion 221*a*, the inclined portion 221*b* and the contact point part 221*c* of the top ground pin 221.

Note that the base end portion 222*a* is contacted to each top signal pin of the host connector 100.

Figure 14:
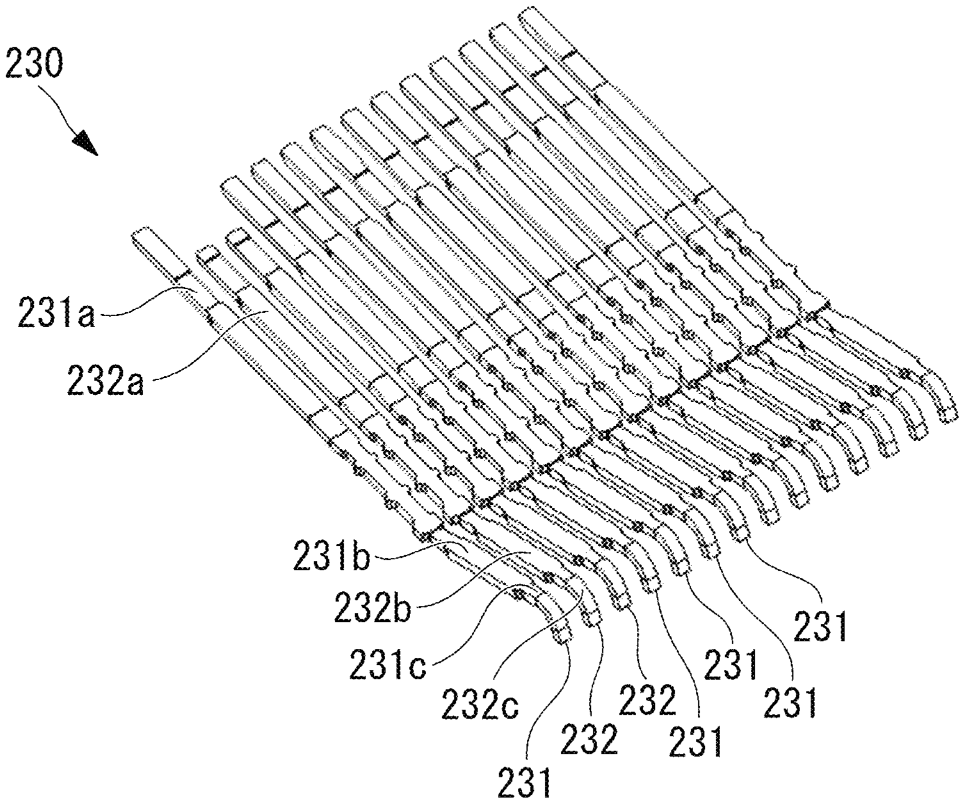
FIG. 14 is a perspective view of a part of the bottom pin group.

As illustrated in FIG. 14, the bottom pin group 230 is a group of contact pins configured such that a plurality of bottom ground pins 231 and a plurality of bottom signal pins 232 are aligned in the predetermined direction.

In the bottom pin group 230, the plurality of bottom ground pins 231 and the plurality of bottom signal pins 232 are aligned in accordance with the alignment of respective contact pins of the bottom pin group 130 of the host connector 100.

As illustrated in FIG. 6, the alignment direction of these contact pins of the bottom pin group 230 matches the longitudinal direction of the housing 210.

As illustrated in FIG. 14, each bottom ground pin 231 is an elongated metal terminal for electrical conduction and has a base end portion 231*a* and an inclined portion 231*b*.

The base end portion 231*a* is a portion to which each bottom ground pin of the host connector 100 is contacted, and the base end portion 231*a* extends in substantially the horizontal direction.

The base end portion 231*a* passes through the insertion hole 211*a* and the pin groove 212*a* when the bottom ground pin 231 is held by the housing 210.

The inclined portion 231*b* is a portion inclined relative to the base end portion 231*a*.

A contact point part 231*c* bent convex toward the substrate insertion space 213 (see FIG. 7) is formed on the tip side of the inclined portion 231*b*. The contact point part 231*c* serves as a contact point with the plug connector substrate 321.

When the bottom ground pin 231 is inserted in and held by the housing 210, the inclined portion 231*b* passes through each clearance formed between adjacent partition parts 211*b* and extends outward from the back face of the plate-like part 211.

Each bottom signal pin 232 is an elongated metal terminal for electrical conduction and has a base end portion 232*a* and an inclined portion 232*b*.

The configuration of the base end portion 232*a*, the inclined portion 232*b*, and a contact point part 232*c* is the same as the configuration of the base end portion 231*a*, the inclined portion 231*b* and contact point part 231*c* of the bottom ground pin 231.

Note that the base end portion 232*a* is contacted to each bottom signal pin of the host connector 100.

Figure 4:
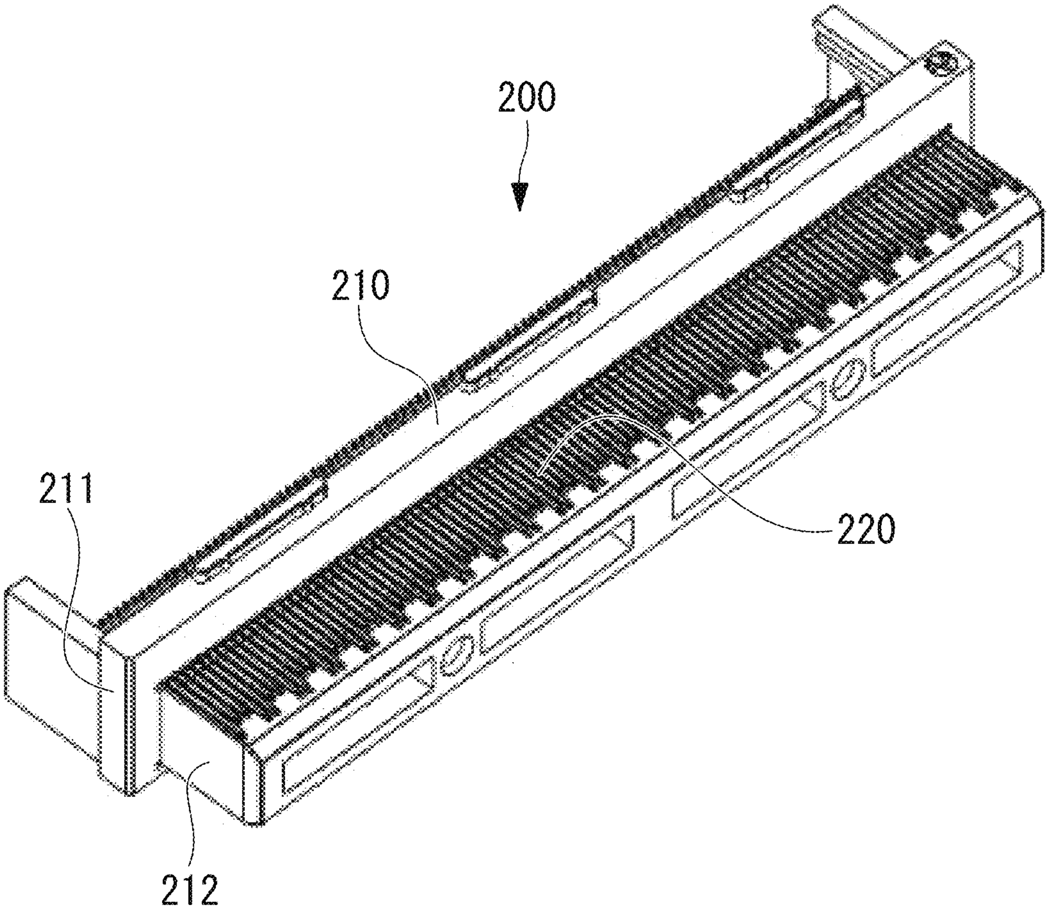
FIG. 4 is a perspective view of a plug connector when viewed from above back.
Figure 5:
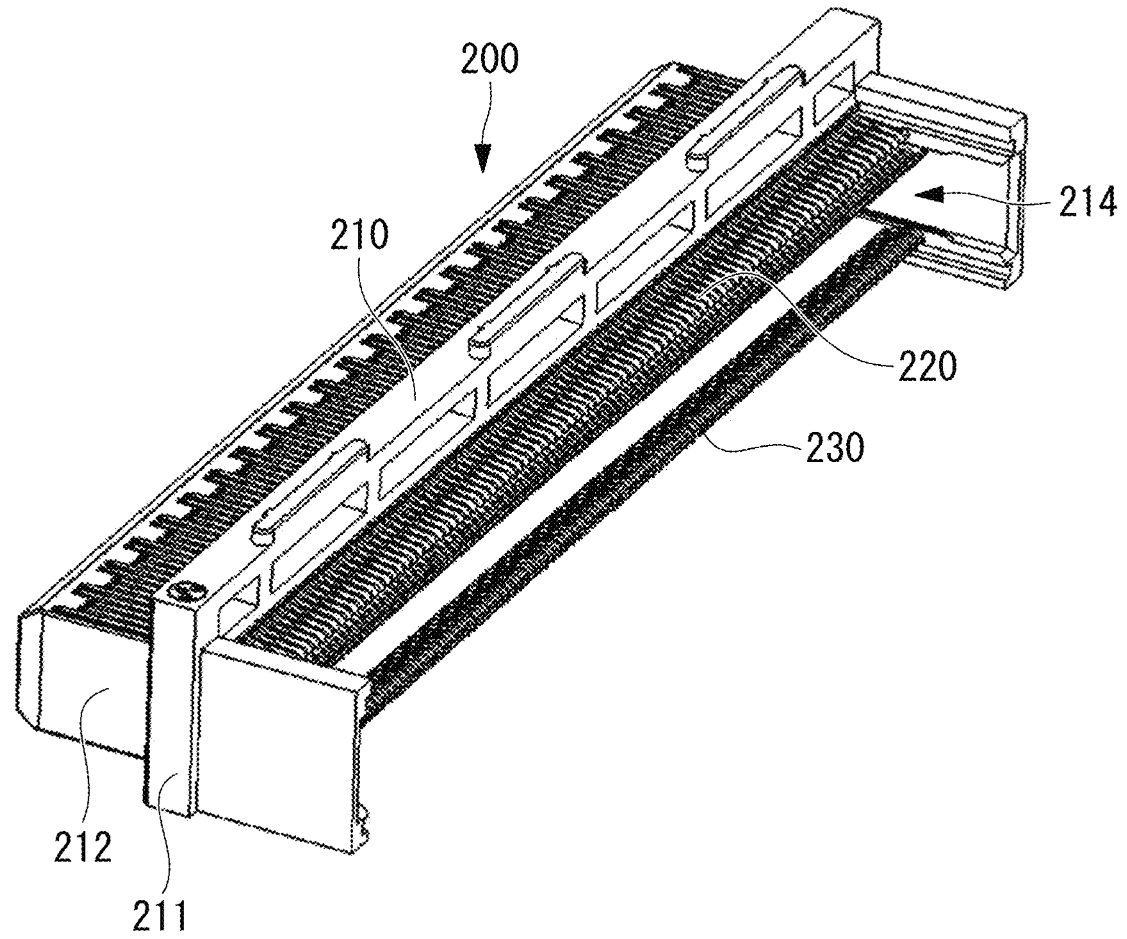
FIG. 5 is a perspective view of the plug connector when viewed from above front.

In a state where the top pin group 220 and the bottom pin group 230 are assembled to the housing 210 and a state where the plug connector 200 is inserted in the host connector 100 mounted on the mount substrate 310, the top pin group 220 (in detail, the inclined portion 221*b* and the inclined portion 222*b*) is arranged so as to be located above the bottom pin group 230 (in detail, the inclined portion 231*b* and the inclined portion 232*b*) and face the bottom pin group 230, as illustrated in FIG. 4 and FIG. 5.

In other words, the bottom pin group 230 is arranged so as to be located below the top pin group 220 and face the top pin group 220. That is, the bottom pin group 230 is arranged at a closer position to the mount substrate 310 than the top pin group 220 (arranged at a position on the mount substrate 310 side) in a state where the plug connector 200 is inserted in the host connector 100.

With such arrangement, more space becomes available above the top pin group 220 in the same manner as the host connector 100.

As illustrated in FIG. 4 and FIG. 5, the housing 210, the top pin group 220, and the bottom pin group 230 configured as described above are assembled, and thereby the plug connector 200 is formed.

<Partition Part and Slope Part>

As illustrated in FIG. 12, a plurality of partition parts 211*b* and a plurality of slope parts 211*c* described above are formed in the housing 210.

Herein, each partition part 211*b* separates adjacent two contact pins from each other. This can reduce crosstalk between these contact pins and enables impedance adjustment.

Further, the impedance adjustment is enabled by the slope part 211*c*. In addition, the slope part 211*c* functions as a portion that reinforces the root of each partition part 211*b*.

As described above and as illustrated in FIG. 4, the housing 210 has, in an integral manner, the plate-like part (base part) 211 and the protruding part 212 protruding from the plate-like part 211 in the insertion direction (intersecting direction) of the plug connector 200 and configured to be inserted in the host connector 100. The housing 210 is molded by injecting a liquid resin into a mold 400 and curing the resin inside the mold 400, as described later.

Further, as described above and as illustrated in FIG. 10, the housing 210 has pin grooves (grooves) 212*a* that accommodate contact pins (the top ground pin 221, the top signal pin 222, the bottom ground pin 231, the bottom signal pin 232) provided to the surface of the protruding part 212 and has insertion holes 211*a* penetrating between the front face and the back face of the plate-like part 211. Further, the housing 210 has holes 212*b* provided aligned with the pin grooves 212*a* in the insertion direction of the plug connector 200 and recessed from the surface deeper than the pin grooves 212*a*.

As illustrated in FIG. 10, each pin groove 212*a* is formed so as to be recessed from the surface of the protruding part 212. The pin groove 212*a* extends in the insertion direction of the plug connector 200. The pin groove 212*a* is formed such that the length in the longitudinal direction and the length in the short direction are slightly larger than the length in the longitudinal direction and the length in the short direction of the contact pin to be accommodated. The pin groove 212*a* accommodates a contact pin when the contact pin is placed on the bottom face.

As illustrated in FIG. 10 and FIG. 11, each insertion hole 211*a* extends in the insertion direction of the plug connector 200. Each contact pin is inserted in the insertion hole 211*a*.

As illustrated in FIG. 10, each hole 212*b* is provided at the end on the plate-like part 211 side of the protruding part 212. The hole 212*b* is formed so as to be recessed from the surface of the protruding part 212. The hole 212*b* penetrates from the surface of the protruding part 212 to the substrate insertion space 213 (see FIG. 7 and FIG. 11). Note that the hole 212*b* may be a recess having a bottom face instead of a through hole. When the hole 212*b* is a recess, the depth of the hole 212*b* is deeper than the depth of the pin groove 212*a*.

As illustrated in FIG. 10, a plurality of holes 212*b* are provided. The plurality of holes 212*b* are arranged aligned at a predetermined interval in the longitudinal direction of the housing 210. In the present embodiment, the plurality of holes 212*b* are arranged aligned at an interval of 0.5 mm or less.

The position of each hole 212*b* in the longitudinal direction of the housing 210 corresponds to the position of each insertion hole 211*a* and each pin groove 212*a*. Each pin groove 212*a*, each hole 212*b*, and the insertion hole 211*a* are arranged aligned in this order along the insertion direction of the plug connector 200 from the tip side of the protruding part 212. That is, each hole 212*b* is provided between each pin groove 212*a* and each insertion hole 211*a*.

As described above, the plurality of holes 212*b* are formed aligned at an interval of 0.5 mm or less in the longitudinal direction of the housing 210. That is, the plurality of insertion holes 211*a* and the plurality of pin grooves 212*a* are also formed aligned at an interval of 0.5 mm or less in the longitudinal direction of the housing 210.

Further, similarly, a plurality of contact pins are also formed aligned at an interval of 0.5 mm or less in the longitudinal direction of the housing 210.

Next, a mold 400 used in manufacturing of the plug connector 200 according to the present embodiment will be described. The mold 400 is used in manufacturing of the housing 210 of the plug connector 200.

Figure 15:
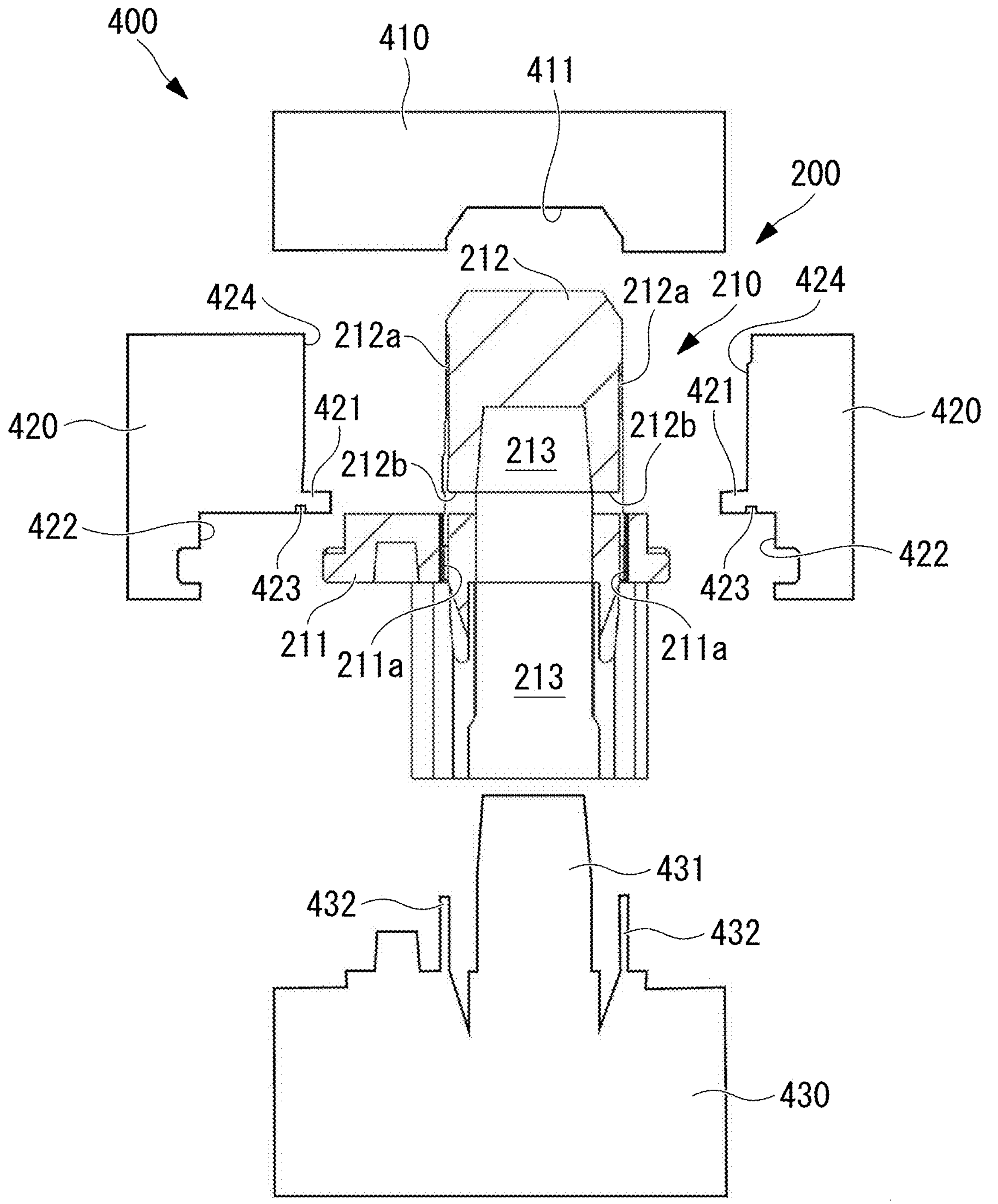
FIG. 15 is a longitudinal sectional view illustrating a mold and illustrates a state where a stationary piece, slide pieces, and a movable piece are not in engagement.
Figure 16:
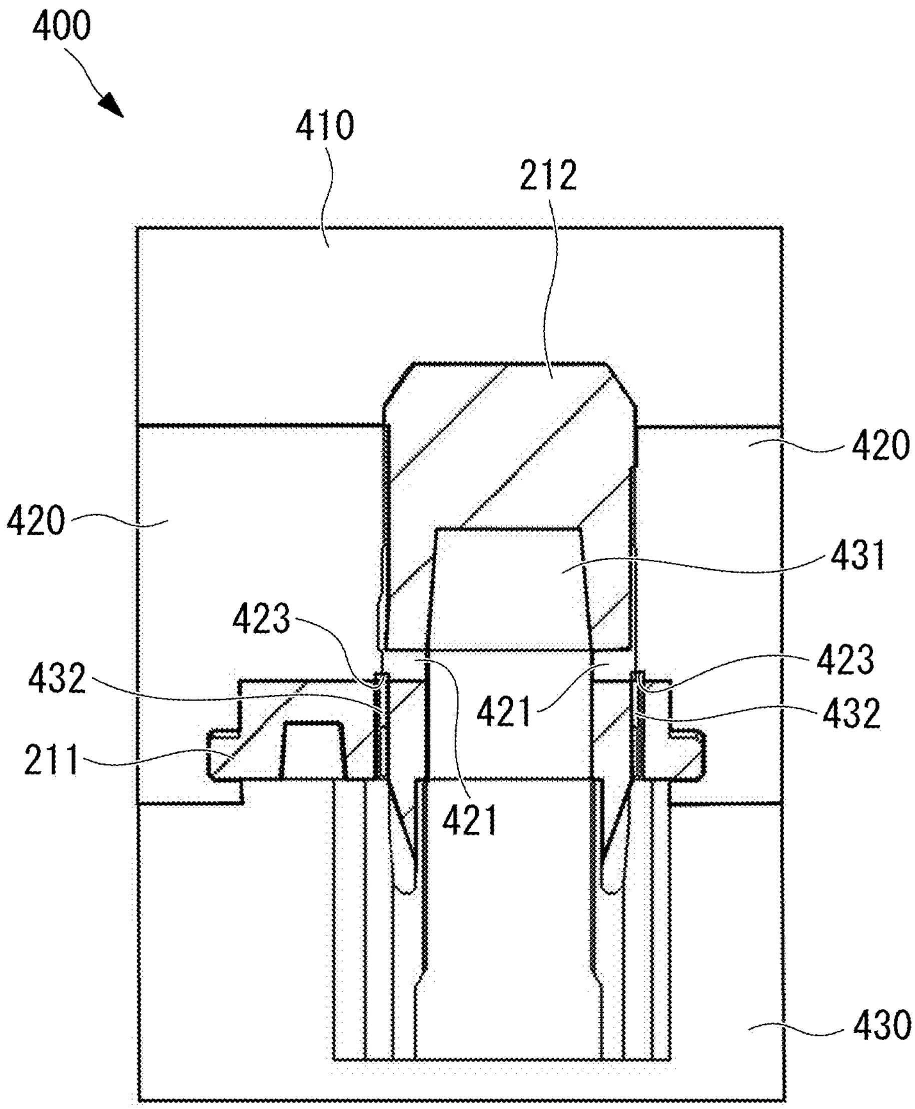
FIG. 16 is a longitudinal sectional view illustrating the mold and illustrates a state where the stationary piece, the slide pieces, and the movable piece are in engagement.

As illustrated in FIG. 15 and FIG. 16, the mold 400 has a stationary piece 410, a pair of slide pieces 420, and a movable piece 430. When the stationary piece 410, the slide pieces 420, and the movable piece 430 are engaged with each other, a closed space is defined inside the mold 400. A liquid resin is injected into the closed space defined inside the mold 400, and thereby the housing 210 is molded.

The stationary piece 410 is fixed and is not moved. The stationary piece 410 has a stationary piece recess 411 formed in a face facing the closed space. The stationary piece recess 411 has a shape corresponding to the tip portion of the protruding part 212 of the housing 210. As illustrated in FIG. 16, the resin filled in the stationary piece recess 411 forms the tip portion of the protruding part 212 of the housing 210.

As illustrated in FIG. 15, the pair of slide pieces 420 are slidably movable in a direction orthogonal to the longitudinal direction of the housing 210 and the insertion direction of the plug connector 200 (which is the lateral direction in the drawing sheet of FIG. 15 and, hereafter, referred to as "slide direction").

The pair of slide pieces 420 are spaced apart from each other in the slide direction, and the closed space is defined between the pair of slide pieces 420. Each slide piece 420 has a slide piece protrusion (protrusion) 421 protruding from the face facing the closed space. The slide piece protrusion 421 protrudes in the slide direction. The slide piece protrusion 421 has a shape corresponding to the hole 212*b* of the housing 210. As illustrated in FIG. 16, when the resin has been filled in the closed space, the holes 212*b* are formed by the slide piece protrusions 421. A plurality of slide piece protrusions 421 are provided. The plurality of slide piece protrusions 421 are arranged aligned at a predetermined interval in the longitudinal direction of the housing 210 (the depth direction in the drawing sheet of FIG. 15).

As illustrated in FIG. 15, each slide piece 420 has a slide piece recess 422 recessed from the face facing the closed space. The slide piece recess 422 is recessed in the slide direction. The slide piece recess 422 has a shape corresponding to the plate-like part 211 of the housing 210. As illustrated in FIG. 16, the resin filled in the slide piece recess 422 forms the plate-like part 211.

As illustrated in FIG. 15, a fitting recess 423 is provided in each face that belongs to both the slide piece protrusion 421 and the slide piece recess 422 and faces the movable piece 430. As illustrated in FIG. 16, the tip portions of core pins 432 of the movable piece 430 described later are fitted into the fitting recesses 423 when the mold 400 defines the closed space. The diameter of each fitting recess 423 is formed slightly larger than the outer diameter of the core pin 432.

Note that, although each fitting recess 423 is formed so as to span the slide piece protrusion 421 and the slide piece recess 422 in the present embodiment, the position where the fitting recess 423 is provided is not limited thereto. For example, the fitting recess 423 may be formed in only any one of the slide piece protrusion 421 and the slide piece recess 422.

As illustrated in FIG. 15, each slide piece 420 has a pin groove formation part (groove formation part) 424 protruding from a face facing the closed space. The pin groove formation part 424 is provided in the face forming the protruding part 212 of the housing 210 when the resin has been filled in the closed space. The pin groove formation part 424 protrudes in the slide direction. The pin groove formation part 424 has a shape corresponding to the pin groove 212*a* of the housing 210. As illustrated in FIG. 16, when the resin has been filled in the closed space, the pin grooves 212*a* are formed by the pin groove formation parts 424. A plurality of pin groove formation parts 424 are provided. The plurality of pin groove formation parts 424 are arranged aligned at a predetermined interval in the longitudinal direction of the housing 210 (the depth direction in the drawing sheet of FIG. 15).

Because the slide pieces 420 are provided, the pin grooves 212*a* can be suitably formed.

The movable piece 430 is movable in the insertion direction of the plug connector 200 (the vertical direction in the drawing sheet of FIG. 15). The movable piece 430 faces the stationary piece 410, and the closed space is defined between the movable piece 430 and the stationary piece 410.

The movable piece 430 has a movable piece protrusion 431 formed on a face facing the closed space. The movable piece protrusion 431 has a shape corresponding to the substrate insertion space 213 of the housing 210. As illustrated in FIG. 16, when the resin has been filled in the closed space, the substrate insertion space 213 is defined by the movable piece protrusion 431.

The movable piece 430 has core pins 432 formed on the face facing the closed space. Each core pin 432 has a shape corresponding to the insertion hole 211*a* of the housing 210. As illustrated in FIG. 16, when the resin has been filled in the closed space, the insertion holes 211*a* are formed by the core pins 432. As illustrated in FIG. 16, the tip portions of the core pins 432 are fitted into the fitting recesses 423 of the slide pieces 420 when the mold 400 has defined the closed space. In the state where the fitting recesses 423 and the core pins 432 are fitted to each other, motion of the core pin 432 in the slide direction and the longitudinal direction of the housing 210 (in other words, the longitudinal direction of the mold 400) are limited.

A plurality of core pins 432 are provided. The plurality of core pins 432 are provided so as to interpose the movable piece protrusion 431 and arranged aligned at a predetermined interval in the longitudinal direction of the housing 210 (the depth direction in the drawing sheet of FIG. 15).

Next, a method of manufacturing the plug connector 200 according to the present embodiment will be described.

First, the housing 210 is molded.

As illustrated in FIG. 15 and FIG. 16, the pair of slide pieces 420 are slid in the slide direction to a predetermined position relative to the stationary piece 410 (slide piece motion step).

Figure 17:
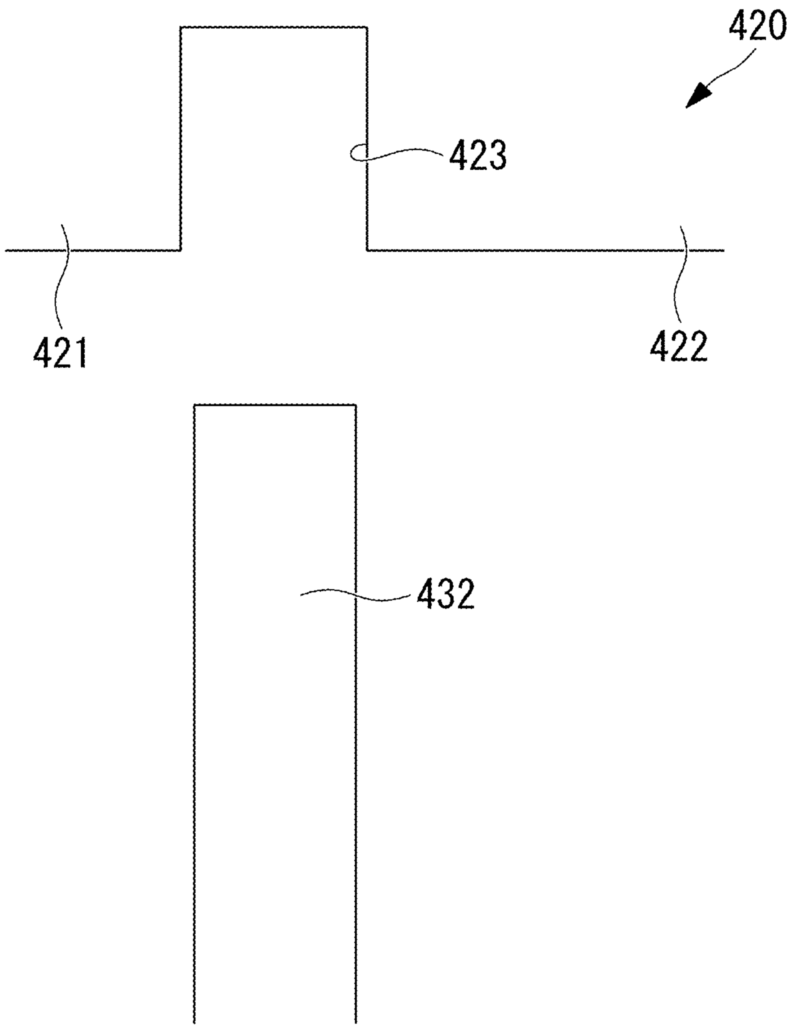
FIG. 17 is an enlarged view of a main portion of the mold and illustrates a state where a core pin is not inserted in a fitting recess.
Figure 18:
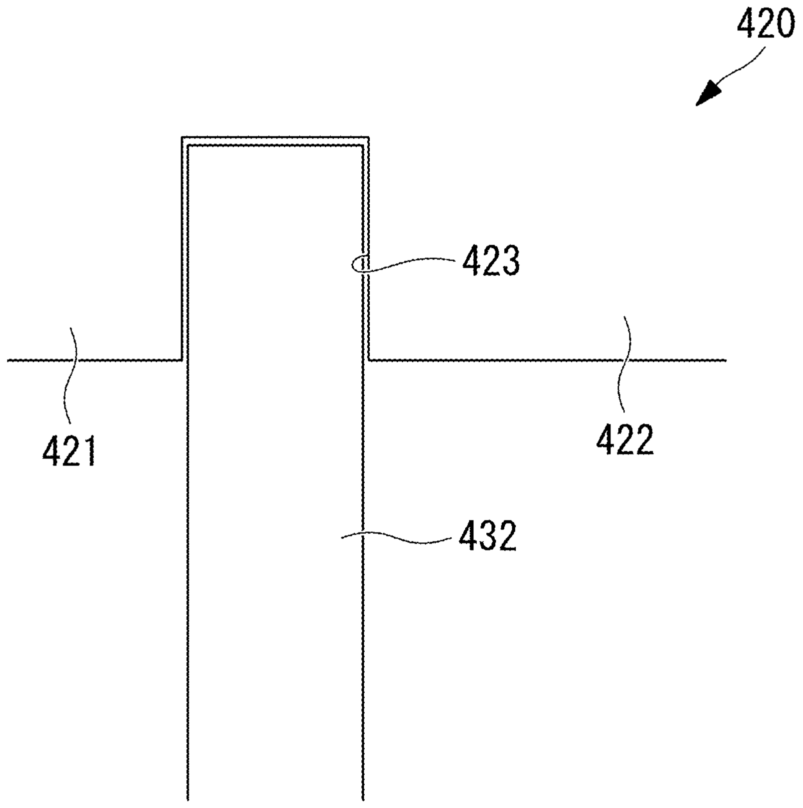
FIG. 18 is an enlarged view of a main portion of the mold and illustrates a state where the core pin is inserted in the fitting recess.

Next, the movable piece 430 is moved to a predetermined position relative to the stationary piece 410 and the slide pieces 420 (movable piece motion step). In the movable piece motion step, as illustrated in FIG. 17 and FIG. 18, the tips of all the core pins 432 are inserted in the corresponding fitting recesses 423, respectively. The tips of the core pins 432 are inserted in the fitting recesses 423, and thereby the fitting recesses 423 and the core pins 432 are fitted to each other (fitting step). In the state where the fitting recesses 423 and the core pins 432 are fitted to each other, motion of the core pin 432 in the slide direction and the longitudinal direction of the housing 210 (in other words, the longitudinal direction of the mold 400) are limited.

As illustrated in FIG. 16, once the slide piece 420 and the movable piece 430 are moved to a predetermined position, a closed space is defined inside the mold 400. This closed space has a shape corresponding to the housing 210 to be molded. Once the closed space is defined, a liquid resin is injected in the closed space (resin injection step). In such a way, a liquid resin is filled in the closed space.

Next, the resin filled in the closed space is cooled and solidified (resin solidification step). Once the resin is solidified, the movable piece 430 is moved away from the stationary piece 410 to open the closed space, as illustrated in FIG. 15. Next, the pair of slide pieces 420 are moved away from each other. In such a way, the solidified resin is taken out of the mold 400.

As described above, the housing 210 is molded. Next, various components such as the top pin group 220 and the bottom pin group 230 (see FIG. 4 or the like) are attached to the molded housing 210. In such a way, the plug connector 200 is manufactured.

According to the present embodiment, the following effects and advantages are achieved.

In the present embodiment, the housing 210 has the holes 212*b*. Accordingly, in a portion where the holes 212*b* are formed, a space is defined between the contact pins and the housing 210. In other words, the contact pins and the housing 210 are spaced apart from each other. Accordingly, compared to a case without the hole 212*b* being formed, the contact area between each contact pin and the housing 210 is reduced, and the insertion loss can thus be reduced.

In the present embodiment, the plurality of holes 212*b* are arranged aligned at an interval of 0.5 mm or less in a predetermined direction. Accordingly, even when a plurality of contact pins are arranged in tight alignment having an interval of 0.5 mm or less in a predetermined direction, the contact area between each contact pin and the housing 210 can be reduced, and the insertion loss can thus be reduced.

Further, even when contact pin alignment with a narrower pitch is further developed, since the arrangement of the holes 212*b* to the housing according to the method of the present embodiment can be applied, a good high frequency property can be realized.

Further, when resin is injected to the closed space defined inside the mold 400, the core pins 432 may be moved or deformed by a filling pressure. In particular, since the core pin 432 is provided in a cantilever manner, the tip portion of the core pin 432 is likely to be deformed. With deformation of the core pin 432, a desired shape of the insertion hole 211*a* is not obtained, and this results in uneven thicknesses of the walls partitioning adjacent insertion holes 211*a*. Thus, the molding accuracy of the housing 210 may deteriorate. In particular, such a problem is significant in a plug connector in which the plurality of insertion holes 211*a* are arranged at a short interval (for example, an interval of 0.5 mm or less).

In the present embodiment, however, the tips of all the core pins 432 are inserted in corresponding fitting recesses 423, respectively. In a state where the fitting recesses 423 and the core pins 432 are fitted to each other, motion of the core pin 432 in the slide direction and the longitudinal direction of the housing 210 (in other words, the longitudinal direction of the mold 400) are limited. This can suppress deformation of the core pin 432. Therefore, the molding accuracy of the housing 210 can be improved. In particular, in a plug connector in which the plurality of insertion holes 211*a* are arranged at a short interval (for example, an interval of 0.5 mm or less), the molding accuracy of the housing 210 can be suitably improved.

Further, since the pin groove 212*a* and the insertion hole 211*a* are required to be connected to each other, the core pin 432 is located near the inner face of the slide piece 420 (the face facing the closed space) in a state where the mold 400 defines the closed space. Thus, in the slide piece 420, it would be difficult to form recesses in which the core pins 432 can be inserted. In the present embodiment, however, the slide piece protrusions 421 are provided to the slide piece 420. This can make it easier to provide the fitting recesses 423 in the slide pieces 420.

Note that the present disclosure is not limited to each embodiment described above, and suitable modifications are possible within a scope not departing from the spirit of the present disclosure.

What is claimed is:

1. A plug connector configured to be inserted in a host connector, the plug connector comprising:

a plurality of contact pins aligned in a predetermined direction; and a housing configured to hold the plurality of contact pins, wherein each of the contact pins extends in an intersecting direction that is a direction intersecting the predetermined direction, wherein the housing includes at least one groove provided, extending in the intersecting direction, and each configured to accommodate each of the contact pins and includes at least one hole provided aligned with the groove in the intersecting direction and recessed deeper than the groove from the surface, wherein the groove is formed in a surface of the housing in contact with an outside, and wherein the contact pin is exposed to the outside of the housing in a state where the contact pin is accommodated in the groove.

2. The plug connector according to claim 1, wherein the housing includes a base part and a protruding part protruding in the intersecting direction from the base part and configured to be inserted in the host connector, wherein the groove is provided in a surface of the protruding part, and wherein the hole is provided in the protruding part and adjacent to the base part.

3. The plug connector according to claim 1, wherein a plurality of holes each being the hole are provided, wherein the plurality of holes are arranged aligned at a predetermined interval in the predetermined direction, and wherein the predetermined interval is less than or equal to 0.5 mm.

4. A housing for a plug connector, the housing comprising:

a base part; and a protruding part protruding in one direction from the base part and configured to be inserted in a host connector, wherein the base part includes insertion holes used for insertion of contact pins, wherein the protruding part includes grooves used for accommodation of the contact pins, wherein each of the grooves is provided in a surface of the protruding part in contact with an outside, extends in the one direction, corresponds to each of the insertion holes of the base part, and is configured to accommodate the contact pins in a state where the contact pins are exposed to the outside, and wherein the protruding part includes holes provided aligned with the grooves in the one direction and recessed deeper than the grooves from the surface, and wherein the hole is adjacent to the base part.

5. A manufacturing method of manufacturing a housing included in the plug connector according to claim 1 using a mold, wherein a closed space is defined inside the mold when a stationary piece, slide pieces, and a movable piece are engaged with each other, wherein the movable piece includes a plurality of core pins for forming insertion holes used for insertion of contact pins in the housing, and wherein the slide piece includes a plurality of groove formation parts for forming grooves used for accommodation of the contact pins in the housing, protrusions provided to the groove formation parts and protruding in a direction in the closed space beyond the groove formation parts to form the holes, and fitting recesses formed in faces of the protrusions facing the movable piece, the manufacturing method comprising:

a fitting step of fitting tip portions of the core pins of the movable piece into the fitting recesses of the slide pieces when the slide pieces and the movable piece are engaged with each other;

a resin injection step of injecting a liquid resin in the closed space defined by engagement of the stationary piece, the slide pieces, and the movable piece; and a resin solidification step of cooling and solidifying the resin injected to the closed space.

* * * * *